(12) United States Patent
Zhang et al.

(10) Patent No.: US 10,947,095 B2
(45) Date of Patent: Mar. 16, 2021

(54) ROBOT AND SPLICING METHOD THEREOF, AND ROBOT SPLICING SYSTEM

(71) Applicant: BOE Technology Group Co., Ltd., Beijing (CN)

(72) Inventors: Ying Zhang, Beijing (CN); Yifei Zhang, Beijing (CN); Kai Zhao, Beijing (CN)

(73) Assignee: BOE Technology Group Co., Ltd., Beijing (CN)

(*) Notice: Subject to any disclaimer, the term of this patent is extended or adjusted under 35 U.S.C. 154(b) by 281 days.

(21) Appl. No.: 16/081,822

(22) PCT Filed: Feb. 27, 2018

(86) PCT No.: PCT/CN2018/077379
§ 371 (c)(1),
(2) Date: Aug. 31, 2018

(87) PCT Pub. No.: WO2019/000993
PCT Pub. Date: Jan. 3, 2019

(65) Prior Publication Data
US 2019/0382250 A1    Dec. 19, 2019

(30) Foreign Application Priority Data

Jun. 27, 2017    (CN) .......................... 201710502502.8

(51) Int. Cl.
*B66F 3/44*    (2006.01)
*B25J 5/00*    (2006.01)
*B25J 19/02*   (2006.01)

(52) U.S. Cl.
CPC ................. *B66F 3/44* (2013.01); *B25J 5/007* (2013.01); *B25J 19/027* (2013.01)

(58) Field of Classification Search
CPC ........ B25J 5/007; B25J 19/021; B25J 19/023; B25J 19/027; B66F 9/063; B66F 9/065; B66F 9/075; B66F 9/07572
See application file for complete search history.

(56) References Cited

U.S. PATENT DOCUMENTS 7,850,413 B2    12/2010  Fontana
2012/0029697 A1*   2/2012  Ota ........................ B66F 9/063
                                                  700/253

(Continued)

FOREIGN PATENT DOCUMENTS

CN       203542594       1/2017
CN       205905017       1/2017

(Continued)

OTHER PUBLICATIONS

International Search Report and Written Opinion of the International Searching Authority for corresponding PCT Application No. PCT/CN2018/077379 (Foreign Text, 12 pages; English Translation, 5 pages) (dated May 14, 2018).

*Primary Examiner* — Saul Rodriguez
*Assistant Examiner* — Brendan P Tighe
(74) *Attorney, Agent, or Firm* — Myers Bigel, P.A.

(57) ABSTRACT

The embodiments of the disclosure provide a robot and a splicing method thereof, and a robot splicing system. The robot includes at least two sub-robots, each of the sub-robots including a body, a mobile member located at the bottom of the body, at least one first connecting mechanism and at least one second connecting mechanism located on different sides of the body, the first connecting mechanism of at least one of the sub-robots being configured such that it may be in a fit connection with the second connecting mechanism of at least one other sub-robot, and the second connecting mechanism being configured such that it may be in a fit connection (Continued)

with the first connecting mechanism of at least one other sub-robot.

18 Claims, 12 Drawing Sheets

(56) References Cited

U.S. PATENT DOCUMENTS

2015/0142249 A1* 5/2015 Ooga ................. B66F 9/063
 701/23
2017/0120443 A1* 5/2017 Kang ................. B25J 5/007

FOREIGN PATENT DOCUMENTS

| CN | 107039846 | 8/2017 |
| CN | 107181118 | 9/2017 |
| CN | 206840061 | 1/2018 |

* cited by examiner

ROBOT AND SPLICING METHOD THEREOF, AND ROBOT SPLICING SYSTEM

RELATED APPLICATIONS

The present application is a 35 U.S.C. 371 national stage application of PCT International Application No. PCT/CN2018/077379, filed on Feb. 27, 2018, which claims the benefit of Chinese patent application No. 201710502502.8, filed on Jun. 27, 2017, the contents of which are incorporated herein by reference in their entireties.

TECHNICAL FIELD

The disclosure relates to the field of intelligent technology, and in particular, to a robot and a splicing method thereof, and a robot splicing system.

BACKGROUND

Intelligent warehousing is a link in a logistics process, and the application of the intelligent warehousing guarantees the speed and accuracy of data input in various links in the goods warehouse management, and ensures that an enterprise timely and accurately masters the real data of the inventory and reasonably holds and controls the enterprise inventory. By scientific coding, management may further be conveniently performed on the batches, the shelf lives, etc. of the goods in stock.

SUMMARY

According to an aspect of the disclosure, an embodiment of the disclosure provides a robot including at least two sub-robots, each of the sub-robots including a body, a mobile member located at the bottom of the body, at least one first connecting mechanism and at least one second connecting mechanism located on different sides of the body, the first connecting mechanism of at least one of the sub-robots being configured such that it may be in a fit connection with the second connecting mechanism of at least one other sub-robot, and the second connecting mechanism being configured such that it may be in a fit connection with the first connecting mechanism of at least one other sub-robot.

Exemplarily, the first connecting mechanism includes a first connecting component, and the second connecting mechanism includes a second connecting component, and the first connecting component is configured to be in a snap-fit connection with the second connecting component of at least one other sub-robot, and the second connecting component is configured to be in a snap-fit connection with the first connecting component of at least one other sub-robot.

Exemplarily, the first connecting component includes a first rotating shaft and a first snap-fit through-groove fixedly coupled to the first rotating shaft, the second connecting component includes a second rotating shaft and a second snap-fit through-groove fixedly coupled to the second rotating shaft, in the process of being coupled to at least one other sub-robot, the first snap-fit through-groove and the second snap-fit through-groove of the at least one other sub-robot may be rotated to a connection state, which connection state is such that the front side wall of the first snap-fit through-groove and the front side wall of the second snap-fit through-groove of the at least one other sub-robot extend into each other's groove, respectively, such that the first snap-fit through-groove is in a pull connection with the second snap-fit through-groove of the at least one other sub-robot.

Exemplarily, the first snap-fit through-groove and the second snap-fit through-groove may be rotated to a retracted state, which retracted state is such that the opening of the first snap-fit through-groove faces away from the body, and the opening of the second snap-fit through-groove faces the body.

Exemplarily, the inside of the front side wall of the first snap-fit through-groove is arranged with a first elastic member, and/or the inside of the front side wall of the second snap-fit through-groove is arranged with a second elastic member.

Exemplarily, the first connecting mechanism further includes a locking component, and the locking component is configured such that it may lock the first snap-fit through-groove of at least one sub-robot and the second snap-fit through-groove of at least one other sub-robot in the connection state.

Exemplarily, the locking component includes a first driving member with a third rotating shaft, a first gear, a fourth rotating shaft which is arranged along the center axis of the first gear and may drive the first gear to rotate, a synchronous belt of which both ends are set around the third rotating shaft and the fourth rotating shaft, respectively, and a rack that engages with the first gear, and the front end of the rack is configured to abut the front side wall of the second snap-fit through-groove coupled to the first snap-fit through-groove in the connection state.

Exemplarily, the front end of the rack is arranged with a blocking member, and the front end of the blocking member is arranged with a third elastic member.

Exemplarily, the rack is a double-sided rack, and both the two opposite surfaces of the rack are arranged with teeth, and the locking component further includes a second gear, and the second gear and the first gear engage with the teeth on the two surfaces of the rack, respectively.

Exemplarily, the first connecting component further includes a second driving member configured to drive the first rotating shaft to rotate, and the second connecting component further includes a third driving member configured to drive the second rotating shaft to rotate.

Exemplarily, the robot further includes a distance sensor, and the distance sensor is located at the first connecting mechanism side and/or the second connecting mechanism side.

Exemplarily, the robot further includes a photoelectric sensor, which includes a transmitter and a receiver, and the first connecting mechanism side and the second connecting mechanism side are arranged with the transmitter and the receiver, respectively, and in the process of the at least one sub-robot being coupled to the at least one other sub-robot, the transmitter and the receiver of the first connecting mechanism side and the second connecting mechanism side in a fit connection with each other are aligned.

Exemplarily, both the first connecting mechanism side and the second connecting mechanism side are arranged with the transmitter and the receiver, and in the process of the at least one sub-robot being coupled to the at least one other sub-robot, the transmitters of the sides where the first connecting mechanism and the second connecting mechanism in a fit connection with each other are located are aligned with the receivers at the opposite sides, and the receivers of the sides where the two are located are aligned with the transmitters at the opposite sides.

Exemplarily, the robot further includes an attitude information collector located at the bottom of the body and a first processor coupled to the attitude information collector, the attitude information collector is configured to collect information of an attitude tag, and the information of the attitude tag is configured to characterize the orientation of an individual side of the robot, and the first processor is configured to control the sub-robots to adjust attitudes, such that the information collected by the attitude information collector matches the predetermined information in the attitude tag.

Exemplarily, the robot further includes a position information collector located at the bottom of the body and a second processor coupled to the position information collector, the position information collector is configured to collect information of a position tag, and the information of the position tag is configured to characterize the positions where the sub-robots are located, and the second processor is configured to control the sub-robots to adjust positions, such that the information collected by the position information collector matches the predetermined information of the position tag.

According to another aspect of the disclosure, an embodiment of the disclosure provides a robot splicing system, including:
  position tags and attitude tags,
  at least one of the position tags and the attitude tags corresponding to one sub-robot as described above, forming a sub-region corresponding to the one sub-robot,
  in each sub-region, the position tag being configured to characterize the position of the sub-robot, and the attitude tag being configured to characterize the orientation of an individual side of the sub-robot.

According to still another aspect of the disclosure, an embodiment of the disclosure provides a method for splicing a robot as described in the first aspect, which method includes:
  moving at least two sub-robots to selected positions of corresponding adjacent sub-regions respectively, and adjusting each of the at least two sub-robots to a selected attitude, and
  fixing at least one of the at least two sub-robots, moving at least one other sub-robot located in a sub-region adjacent to the sub-region where the fixed sub-robot is located in a direction toward the fixed sub-robot, and connecting the fixed sub-robot and the moved sub-robot by a first connecting mechanism and a second connecting mechanism.

Exemplarily, the step of moving at least two sub-robots to selected positions of corresponding adjacent sub-regions respectively includes: moving a sub-robot to a corresponding sub-region, collecting information of a position tag in the sub-region, and controlling the sub-robot to adjust the position, such that the information collected by a position information collector matches the predetermined information of the position tag.

Exemplarily, the step of adjusting each of the at least two sub-robots to a selected attitude includes: collecting information of an attitude tag in the sub-region, and controlling the robot to adjust the attitude, such that the information collected by an attitude information collector matches the predetermined information of the attitude tag.

Exemplarily, the attitude tag is parallel to one side of the robot, and the step of adjusting each of the at least two sub-robots to a selected attitude further includes: collecting information of a position tag in the sub-region, and controlling the sub-robot to rotate by 180° in the sub-region in a state in which the collected information does not match the predetermined information of the position tag.

Exemplarily, the step of connecting the fixed sub-robot and the moved sub-robot by a first connecting mechanism and a second connecting mechanism includes: fixing at least one of the at least two sub-robots, and moving at least one other sub-robot located in a sub-region adjacent to the sub-region where the fixed sub-robot is located in a direction toward the fixed sub-robot, such that the fixed sub-robot and the moved sub-robot located in the adjacent sub-region are separated by a first selected distance, adjusting the moved sub-robot, to align the first connecting component with the second connecting component, controlling the first snap-fit through-groove and the second snap-fit through-groove to be rotated to a connection state, controlling the moved sub-robot to move a second selected distance in a direction away from the fixed sub-robot, and moving the locking component, to fix the connected first snap-fit through-groove and second snap-fit through-groove.

BRIEF DESCRIPTION OF THE DRAWINGS

In order to more clearly illustrate the technical solutions in embodiments of the disclosure or the reference, the appended drawings needing to be used in the description of the embodiments or the reference will be introduced briefly in the following. Obviously, the drawings in the following description are only some embodiments of the disclosure, and for the person having ordinary skills in the art, other drawings may also be obtained according to these drawings under the premise of not paying out undue experimentation.

DETAILED DESCRIPTION

In the following the technical solutions in embodiments of the disclosure will be described clearly and completely in conjunction with the drawings in the embodiments of the disclosure. Obviously, the described embodiments are just a part of the embodiments of the disclosure, and not all the embodiments. Based on the embodiments in the disclosure, all the other embodiments obtained by the person having ordinary skills in the art under the premise of not paying out undue experimentation pertain to the scope protected by the disclosure.

In the following description, the technical terminology or the scientific terminology used in the disclosure should have the general meanings understood by the person having general skills in the art that the disclosure belongs to. The "first", "second" and similar words used in the disclosure do not mean any order, number or importance, but are just used to differentiate between different constituent parts. The word "include" or "included" or the like means that an element or article preceding the word encompasses the element or article listed behind the word and the equivalent thereof, without excluding other elements or articles. The word "connection" or "connected" or the like is not limited to a physical or mechanical connection, but may include an electrical connection, whether it is direct or indirect. The "up", "down", "left", or "right", etc. is just used for denoting a relative position relationship, and when the absolute position of a described object changes, the relative position relationship may also change correspondingly, and relevant information related to "selected", etc. may be set or stored in advance, or it may also be such that the corresponding parameter setting is changed by way of updating, refreshing, etc. when the demands or the like that are faced change.

In the technology known to the inventors, such as in the intelligent warehousing field, the applied robots are usually uniform in shape, the shelf sizes are also basically uniform, and the robots correspond to the shelf sizes. During use, if the sizes of the goods are significantly smaller than the sizes of the shelves used to place the goods, a situation will occur in which a high power robot carries a small object, resulting in waste of resources, and if the sizes of the goods are significantly greater than the sizes of the shelves used to place the goods, a problem will occur in which a robot cannot carry goods of larger sizes, causing that the scope of application of the robot is limited.

Figure 1:
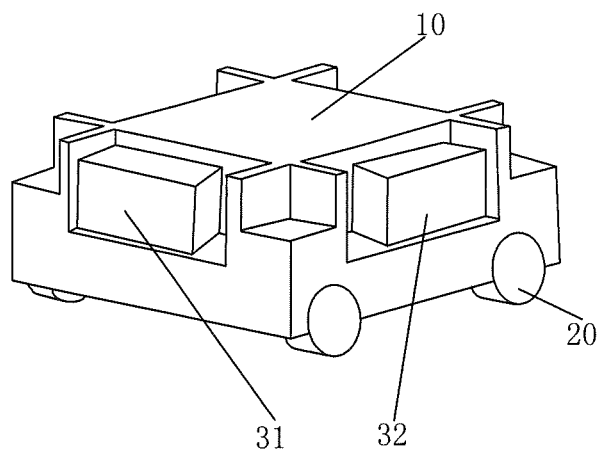
FIG. 1 is a first structure diagram of a robot provided by some embodiments of the disclosure.

At least one embodiment of the disclosure provides a sub-robot, which, as shown in FIG. 1, includes a body 10 and a mobile member 20 located at the bottom of the body 10, and further includes at least one first connecting mechanism 31 and at least one second connecting mechanism 32 located on different sides of the body 10.

When connecting at least two sub-robots to form a robot, the first connecting mechanism 31 is configured to be in a fit connection with the second connecting mechanism 32 of at least one other sub-robot, and the second connecting mechanism 32 is configured to be in a fit connection with the first connecting mechanism 31 of at least one other sub-robot.

In some embodiments, the sub-robot includes one first connecting mechanism 31 and one second connecting mechanism 32.

In some embodiments, the sub-robot includes multiple first connecting mechanisms 31 and second connecting mechanisms 32 located on different sides of the body 10. This is not limited to such that each side of the body is arranged with at least one of the first connecting mechanisms 31 or the second connecting mechanisms 32, and may be such that part of multiple sides is arranged with at least one of the first connecting mechanisms 31 or the second connecting mechanisms 32, or may also be such that each side is arranged with at least one of the first connecting mechanisms 31 or the second connecting mechanisms 32.

For example, taking that the body 10 has four sides as an example, the sub-robot may include one first connecting mechanism 31 and one second connecting mechanism 32, or include two first connecting mechanisms 31 and two second connecting mechanisms 32, or include one first connecting mechanism 31 and two second connecting mechanisms 32, or include two first connecting mechanisms 31 and one second connecting mechanism 32, or include one first connecting mechanism 31 and three second connecting mechanisms 32, or include one second connecting mechanism 32 and three first connecting mechanisms 31, or the like.

In some embodiments, the first connecting mechanism 31 and the second connecting mechanism 32 arranged on the sub-robot correspond to each other structurally. In a state in which they are not installed on the robot, separate one first connecting mechanism 31 and separate one second connecting mechanism 32 may be connected when placed together, and in a state in which they are installed on the robot, the first connecting mechanism 31 and the second connecting mechanism 32 are located on different sides of the body 10, and the connecting mechanisms on the same sub-robot cannot be directly connected, but may be used to be coupled to corresponding connecting mechanisms on other robots, respectively. That is, the first connecting mechanism 31 is configured to be in a fit connection with the second connecting mechanism 32 of at least one other sub-robot, and the second connecting mechanism 32 is configured to be in a fit connection with the first connecting mechanism 31 of at least one other sub-robot.

In some embodiments, the connection between the first connecting mechanism 31 and the second connecting mechanism 32 on different sub-robots may be a mechanical connection, or also may be a magnetic connection, and of course, may further be a connection in any other way, and the embodiments of the disclosure will not define the specific structures of the first connecting mechanism 31 and the second connecting mechanism 32. The setting of the structures and the positions of the connecting mechanisms in FIG. 1 is just schematic, and is not used for any definition.

In some embodiments, the mobile member 20 at the bottom of the body 10 is used to drive the robot to move, for example, may be, but not limited to, a universal wheel.

In some embodiments, the mobile member 20 is a Mecanum wheel.

In some embodiments, the top of the body 10 is used for placing an item to be carried. It may be possible to arrange the top to be a plane as needed, or also it may be possible to arrange a corresponding blocking structure on the top for preventing the item from moving or slipping.

By arranging the first connecting mechanism 31 and/or the second connecting mechanism 32 on the side(s), the sub-robot provided by the embodiments of the disclosure is such that when an item that needs to be carried is greater than the scope that one sub-robot may bear, multiple sub-robots may be connected by the first connecting mechanism 31 and the second connecting mechanism 32 fitting each other, to complete the carrying work. As such, each sub-robot may be arranged relatively small, to reduce or avoid a situation in which a large robot carries a small object, resulting in waste of resources. Yet, when it is necessary to carry an item of larger size, it may be possible to be qualified for the carrying work by splicing between multiple sub-robots and expand the scope of application of robots.

Exemplarily, the first connecting mechanism 31 includes a first connecting component, and the second connecting mechanism 32 includes a second connecting component, and the first connecting component is configured to be in a snap-fit connection with the second connecting component of at least one other sub-robot, and the second connecting component is configured to be in a snap-fit connection with the first connecting component of at least one other sub-robot.

That is, two sub-robots are connected together by the first connecting component in the first connecting mechanism 31 and the second connecting component in the second connecting mechanism 32.

For the embodiment of the disclosure, by mechanically connecting the first connecting component and the second connecting component in a snap-fit manner, its structure is simple, it is easy to implement, and the connection is secure.

Figure 2:
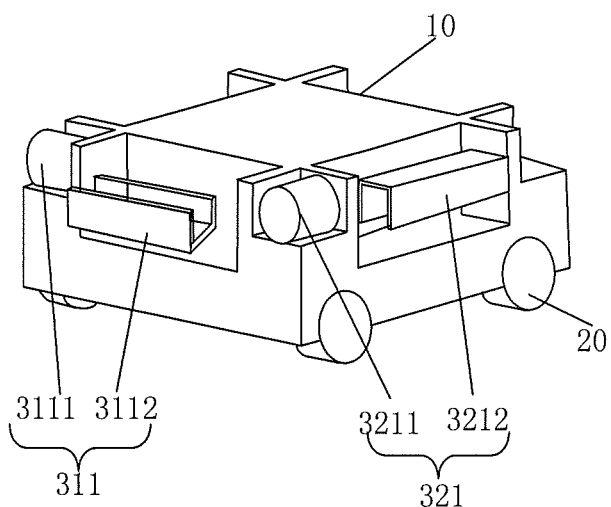
FIG. 2 is a second structure diagram of a robot provided by some embodiments of the disclosure.
Figure 3:
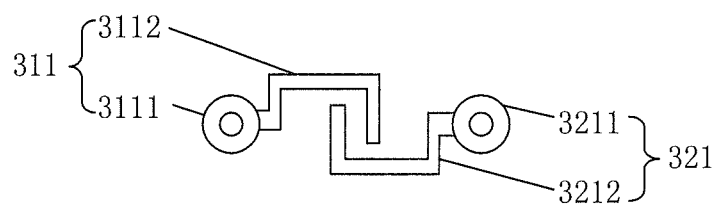
FIG. 3 is a first structure diagram in which the first connecting component and the second connecting component are in the connection state provided by some embodiments of the disclosure.

Exemplarily, as shown in FIG. 2, the first connecting component 311 includes a first rotating shaft 3111 which may be rotated in the paper plane, and a first snap-fit through-groove 3112 fixedly coupled to the first rotating shaft 3111, which has a front side wall, the second connecting component 321 includes a second rotating shaft 3211 which may be rotated in the paper plane, and a second snap-fit through-groove 3212 fixedly coupled to the second rotating shaft 3211, which also has a front side wall, as shown in FIG. 3, the first snap-fit through-groove 3112 and the second snap-fit through-groove 3212 of at least one other sub-robot may be rotated to a connection state, and in the connection state, the front side wall of the first snap-fit through-groove 3112 and the front side wall of the second snap-fit through-groove 3212 of the at least one other sub-robot extend into each other's groove, respectively, such that the first snap-fit through-groove 3112 is in a pull connection with the second snap-fit through-groove 3212 of the at least one other sub-robot.

For example, when two sub-robots need to be spliced, the first rotating shaft 3111 is configured to drive the first snap-fit through-groove 3112 to rotate, and the second rotating shaft 3211 is configured to drive the second snap-fit through-groove 3212 to rotate, such that the first snap-fit through-groove 3112 and the second snap-fit through-groove 3212 configured to connect the two sub-robots are in a pull connection.

For example, the front side wall of the first snap-fit through-groove 3112 refers to the side wall of the first snap-fit through-groove 3112 close to the second snap-fit through-groove 3212 in the process of connecting the two sub-robots, likewise, the front side wall of the second snap-fit through-groove 3212 refers to the side wall of the second snap-fit through-groove 3212 close to the first snap-fit through-groove 3112 in the process of connecting the two sub-robots.

Figure 5:
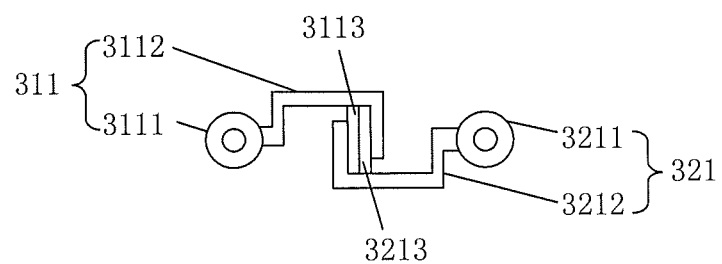
FIG. 5 is a second structure diagram in which the first connecting component and the second connecting component are in the connection state provided by some embodiments of the disclosure.

For example, after the first snap-fit through-groove 3112 is in a pull connection with the second snap-fit through-groove 3212 of the at least one other sub-robot, as shown in FIG. 5, it may be such that the front side walls of the two do not extend into the each other's groove bottom, and of course, they may also contact the groove bottoms.

By causing that the first connecting component 311 includes a first rotating shaft 3111 and a first snap-fit through-groove 3112 fixedly coupled to the first rotating shaft 3111 and the second connecting component 321 includes a second rotating shaft 3211 and a second snap-fit through-groove 3212 fixedly coupled to the second rotating shaft 3211, the embodiment of the disclosure is such that the first snap-fit through-groove 3112 and the second snap-fit through-groove 3212 may be rotated to the connection state and a retracted state by the first rotating shaft 3111 and the second rotating shaft 3211, respectively, and when two sub-robots need to be connected, both are connected by the first snap-fit through-groove 3112 and the second snap-fit through-groove 3212, and when there is no need for connection, both the first snap-fit through-groove 3112 and the second snap-fit through-groove 3212 are retracted, which may avoid damage.

Figure 4:
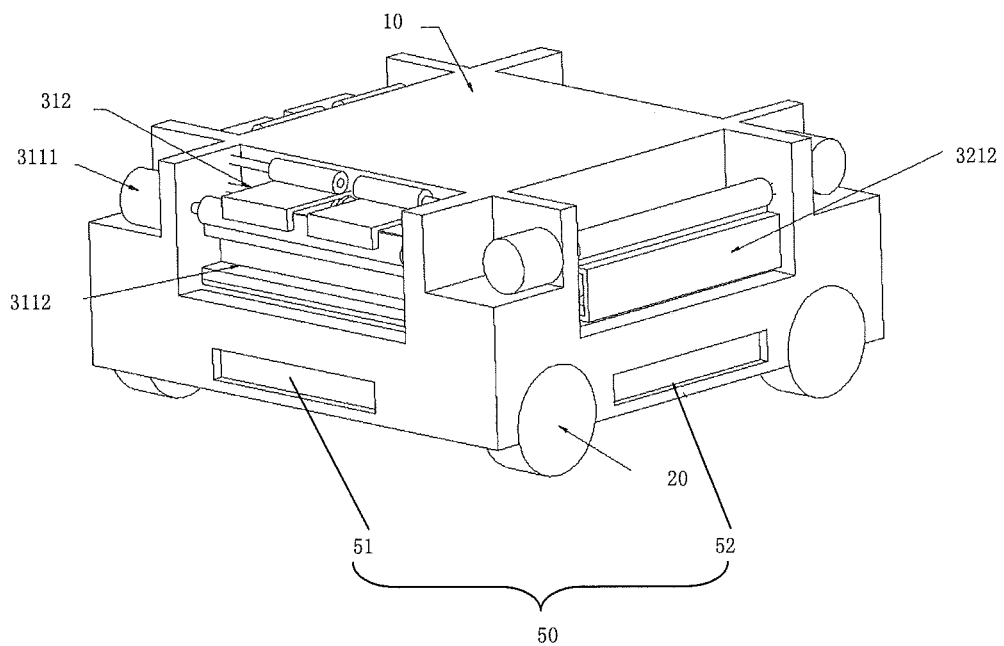
FIG. 4 is a third structure diagram of a robot provided by some embodiments of the disclosure.

Exemplarily, as shown in FIG. 4, the first snap-fit through-groove 3112 and the second snap-fit through-groove 3212 may be rotated to the retracted state, and in the retracted state, the opening of the first snap-fit through-groove 3112 faces away from the body 10, and the opening of the second snap-fit through-groove 3212 faces the body 10.

In some embodiments of the disclosure, in the retracted state, the opening of the first snap-fit through-groove 3112 faces away from the body 10, and the opening of the second snap-fit through-groove 3212 faces the body 10, and in the process of connection, the first snap-fit through-groove 3112 and the second snap-fit through-groove 3212 are rotated by a certain angle, for example, 90°, respectively, such that the two are connected, and the structure is simple.

In some embodiments of the disclosure, as shown in FIG. 5, the inside of the front side wall of the first snap-fit through-groove 3112 is arranged with a first elastic member 3113, and the inside of the front side wall of the second snap-fit through-groove 3212 is arranged with a second elastic member 3213.

In some embodiments, the first elastic member 3113 and the second elastic member 3213 may for example be structures with the elastic contraction function such as silicone, a spring, etc.

In addition, the inside of the front side wall of the first snap-fit through-groove 3112 refers to the side of the front side wall of the first snap-fit through-groove 3112 toward the interior space enclosed by the groove, and the inside of the front side wall of the second snap-fit through-groove 3212 refers to the side of the front side wall of the second snap-fit through-groove 3212 toward the interior space enclosed by the groove.

In some embodiments of the disclosure, the inside of the front side wall of the first snap-fit through-groove 3112 is arranged with a first elastic member 3113.

In some embodiments of the disclosure, the inside of the front side wall of the second snap-fit through-groove 3212 is arranged with a second elastic member 3213.

In some embodiments, the first elastic member 3113 and the second elastic member 3213 may be the same, or also may be different.

For the embodiments of the disclosure, by arranging a first elastic member 3113 in the inside of the front side wall of the first snap-fit through-groove 3112 and/or arranging a second elastic member 3213 in the inside of the front side wall of the second snap-fit through-groove 3212, the connection of the first snap-fit through-groove 3112 and the second snap-fit through-groove 3212 may be caused to be closer.

In some embodiments of the disclosure, as shown in FIG. 4, to further improve the connection effect of the first snap-fit through-groove 3112 and the second snap-fit through-groove 3212, the first connecting mechanism 31 further includes a locking component 312, and the locking component 312 is configured such that it may lock the first snap-fit through-groove 3112 and the second snap-fit through-groove 3212 of at least one other sub-robot in the connection state. That is, after the first snap-fit through-groove 3112 and the second snap-fit through-groove 3212 are connected, the locking component 312 locks both in the connection state to avoid loosening of both.

In some embodiments, the second connecting mechanism 32 may also include a locking component.

Figure 6:
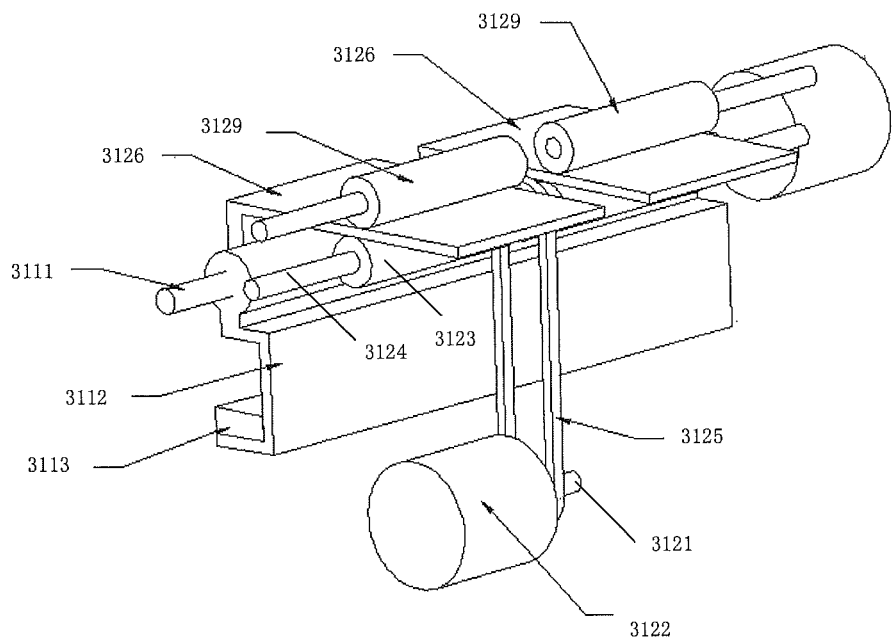
FIG. 6 is a structure diagram of the first connecting mechanism provided by some embodiments of the disclosure.
Figure 7:
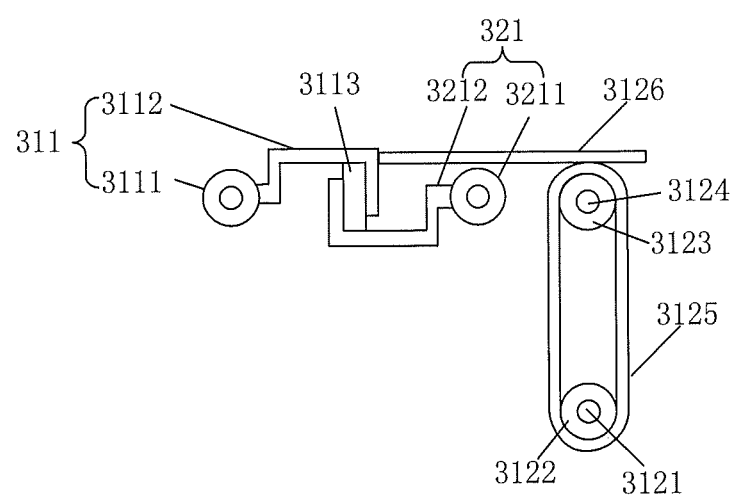
FIG. 7 is a first structure diagram of the first connecting mechanism and the second connecting mechanism provided by some embodiments of the disclosure.

In some embodiments of the disclosure, as shown in FIG. 6 and FIG. 7, the locking component 312 includes a first driving member 3122 with a third rotating shaft 3121, a first gear 3123, a fourth rotating shaft 3124 which is arranged along the center axis of the first gear 3123 and may drive the first gear 3123 to rotate, a synchronous belt 3125 of which both ends are set around the third rotating shaft 3121 and the fourth rotating shaft 3124, respectively, and a rack 3126 that engages with the first gear 3123, and the front end of the rack 3126 is configured to abut the front side wall of the first snap-fit through-groove 3112 coupled to the second snap-fit through-groove 3212 in the connection state.

In some embodiments, it may also be possible to arrange an elastic member at the front end of the rack 3126. Here, the front end of the rack 3126 refers to the end of the rack 3126 which mutually bears force with the front side wall of the first snap-fit through-groove 3112.

Here, the movement principle of the rack 3126 is such that the first driving member 3122 drives the third rotating shaft 3121 to rotate so as to drive the synchronous belt 3125 to move, and the synchronous belt 3125 drives the fourth rotating shaft 3124 to rotate so as to drive the first gear 3123 to rotate, such that the first gear 3123 drives the rack 3126 that engages with it to move.

By arranging the first driving member 3122 and the synchronous belt 3125 to drive the first gear 3123 to rotate so as to drive the rack 3126 to move, the embodiments of the disclosure may facilitate the parts and the components on a robot to be laid out more reasonably.

Figure 8:
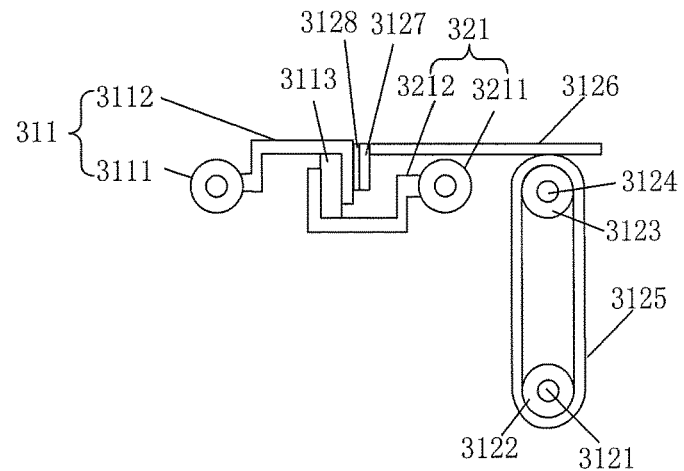
FIG. 8 is a second structure diagram of the first connecting mechanism and the second connecting mechanism provided by some embodiments of the disclosure.

In some embodiments of the disclosure, as shown in FIG. 8, to further improve the effect of the rack 3126 locking the first snap-fit through-groove 3112 and the second snap-fit through-groove 3212, the front end of the rack 3126 is arranged with a blocking member 3127, and the front end of the blocking member 3127 is arranged with a third elastic member 3128. The front end refers to the end of the blocking member 3127 which contacts the first snap-fit through-groove 3112.

Figure 9:
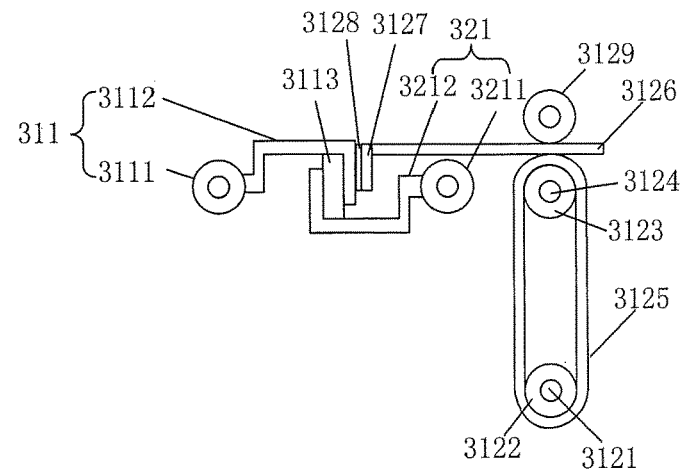
FIG. 9 is a third structure diagram of the first connecting mechanism and the second connecting mechanism provided by some embodiments of the disclosure.

Exemplarily, as shown in FIG. 6 and FIG. 9, the rack 3126 is a double-sided rack, and both the two opposite surfaces of the rack 3126 are arranged with teeth, and the locking component 312 further includes a second gear 3129, and the second gear 3129 and the first gear 3123 engage with the teeth on the two surfaces of the rack 3126, respectively.

In some embodiments, FIG. 6 is illustrated in which the locking component 312 includes two sets of racks 3126 and relevant transmission components, and there may be only one set of rack 3126 and relevant transmission components, or also there may be multiple sets.

By making the locking component 312 include a first gear 3123 and a second gear 3129, the embodiments of the disclosure may ensure that the rack 3126 moves horizontally.

To implement intelligent rotation of the first rotating shaft 3111 and the second rotating shaft 3211, in some embodiments of the disclosure, the first connecting component 311 further includes a second driving member configured to drive the first rotating shaft 3111 to rotate, and the second connecting component 321 further includes a third driving member configured to drive the second rotating shaft 3211 to rotate.

In some embodiments, the first driving member 3122, the second driving member and the third driving member may for example be, but not limited to, driving motors.

In some embodiments of the disclosure, as shown in FIG. 4, to avoid damage to a connecting mechanism due to collision, both the first connecting mechanism 31 and the second connecting mechanism 32 are arranged in recessed parts on the sides of the body 10.

Figure 10:
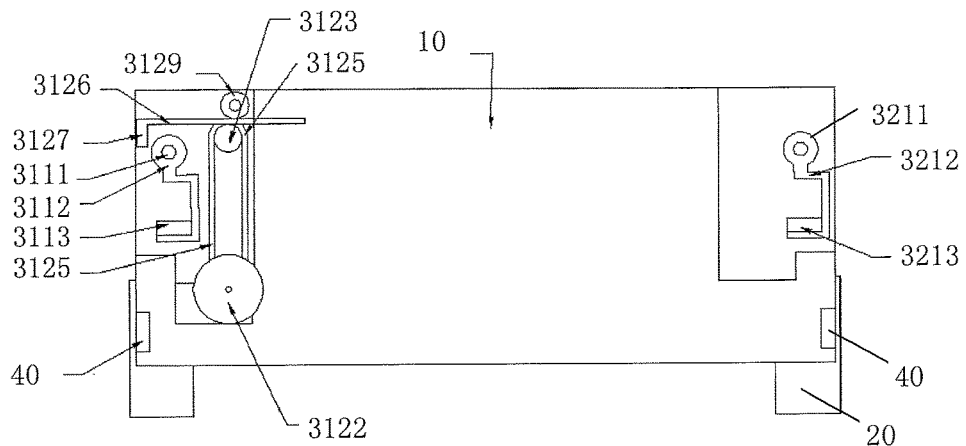
FIG. 10 is a fourth structure diagram of a robot provided by some embodiments of the disclosure.

In some embodiments of the disclosure, as shown in FIG. 10, the sub-robot further includes a distance sensor(s) 40, and the distance sensors 40 are located at the first connecting mechanism 31 side and the second connecting mechanism 32 side, alternatively, the distance sensor 40 is located at the first connecting mechanism 31 side, and alternatively, the distance sensor 40 is located at the second connecting mechanism 32 side.

By arranging a distance sensor 40 on a sub-robot, the embodiments of the disclosure may cause the robot to implement intelligent movement by a predetermined distance, which further intelligentizes the robot.

Figure 11:
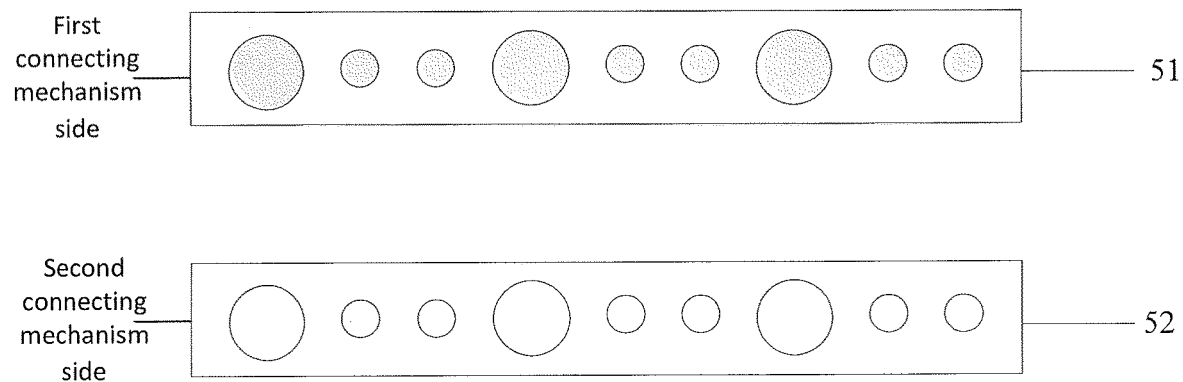
FIG. 11 is a first structure diagram of a photoelectric sensor provided by some embodiments of the disclosure.

In some embodiments of the disclosure, as shown in FIG. 4, the sub-robot further includes a photoelectric sensor 50, which includes a transmitter 51 and a receiver 52, and as shown in FIG. 11, the first connecting mechanism 31 side and the second connecting mechanism 32 side are arranged with the transmitter 51 and the receiver 52, respectively, and in the process of a sub-robot being coupled to at least one other sub-robot, the transmitter 51 and the receiver 52 of the first connecting mechanism 31 side and the second connecting mechanism 32 side in a fit connection with each other are aligned. That is, the transmitter 51 arranged at the first connecting mechanism 31 side is aligned with the receiver 52 arranged at the second connecting mechanism 32 side. Or, the transmitter 51 arranged at the second connecting mechanism 32 side is aligned with the receiver 52 arranged at the first connecting mechanism 31 side.

In some embodiments of the disclosure, the transmitter 51 and the receiver 52 are arranged with a large circle and a small circle, respectively, and the light spot emitted by the large circle is large and used for coarse adjustment, and the light spot emitted by the small circle is small and used for fine tuning. The details are as follows. In the process of adjustment, the robot is first adjusted such that the large circle on the receiver 52 may fully receive the light spot emitted by the large circle on the transmitter 51, and then the robot is further adjusted such that the small circle on the receiver 52 may fully receive the light spot emitted by the small circle on the transmitter 51. Of course, the shape is not limited to a circle, and a closed graphic of any other shape may suffice.

By arranging a photoelectric sensor 50 on the sub-robot, the embodiments of the disclosure may be such that two sub-robots coupled to each other are adjusted to an alignment state by the photoelectric sensor 50.

Figure 12:
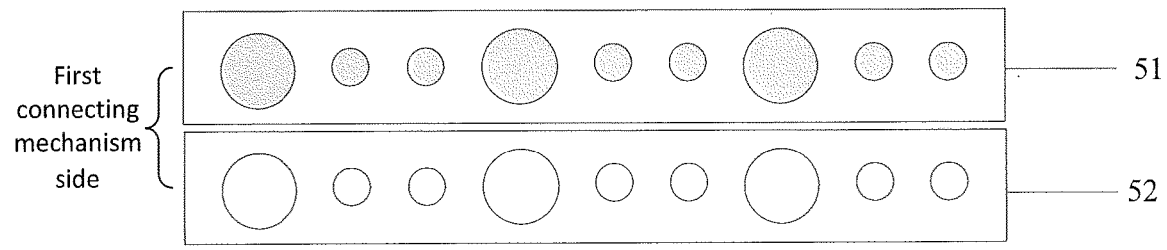
FIG. 12 is a second structure diagram of a photoelectric sensor provided by some embodiments of the disclosure.
Figure 12:
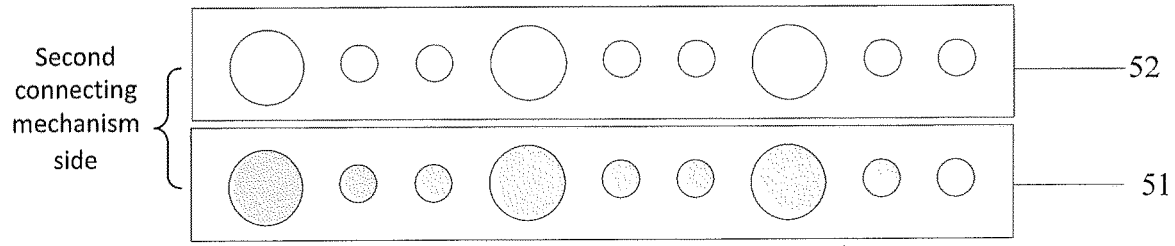

In some embodiments of the disclosure, as shown in FIG. 12, both the first connecting mechanism 31 side and the second connecting mechanism 32 side are arranged with the transmitter 51 and the receiver 52, and in the process of one sub-robot being coupled to at least one other sub-robot, the transmitters 51 of the sides where the first connecting mechanism 31 and the second connecting mechanism 32 in a fit connection with each other are located are aligned with the receivers 52 at the opposite sides, respectively, and the receivers 52 of the sides where the two are located are aligned with the transmitters 51 at the opposite sides, respectively. That is, both the first connecting mechanism 31 side and the second connecting mechanism 32 side are arranged with the transmitter 51 and arranged with the receiver 52. The transmitter 51 arranged at the first connecting mechanism 31 side is aligned with the receiver 52 arranged at the second connecting mechanism 32 side, and the receiver 52 arranged at the first connecting mechanism 31 side is aligned with the transmitter 51 arranged at the second connecting mechanism 32 side.

Figure 13:
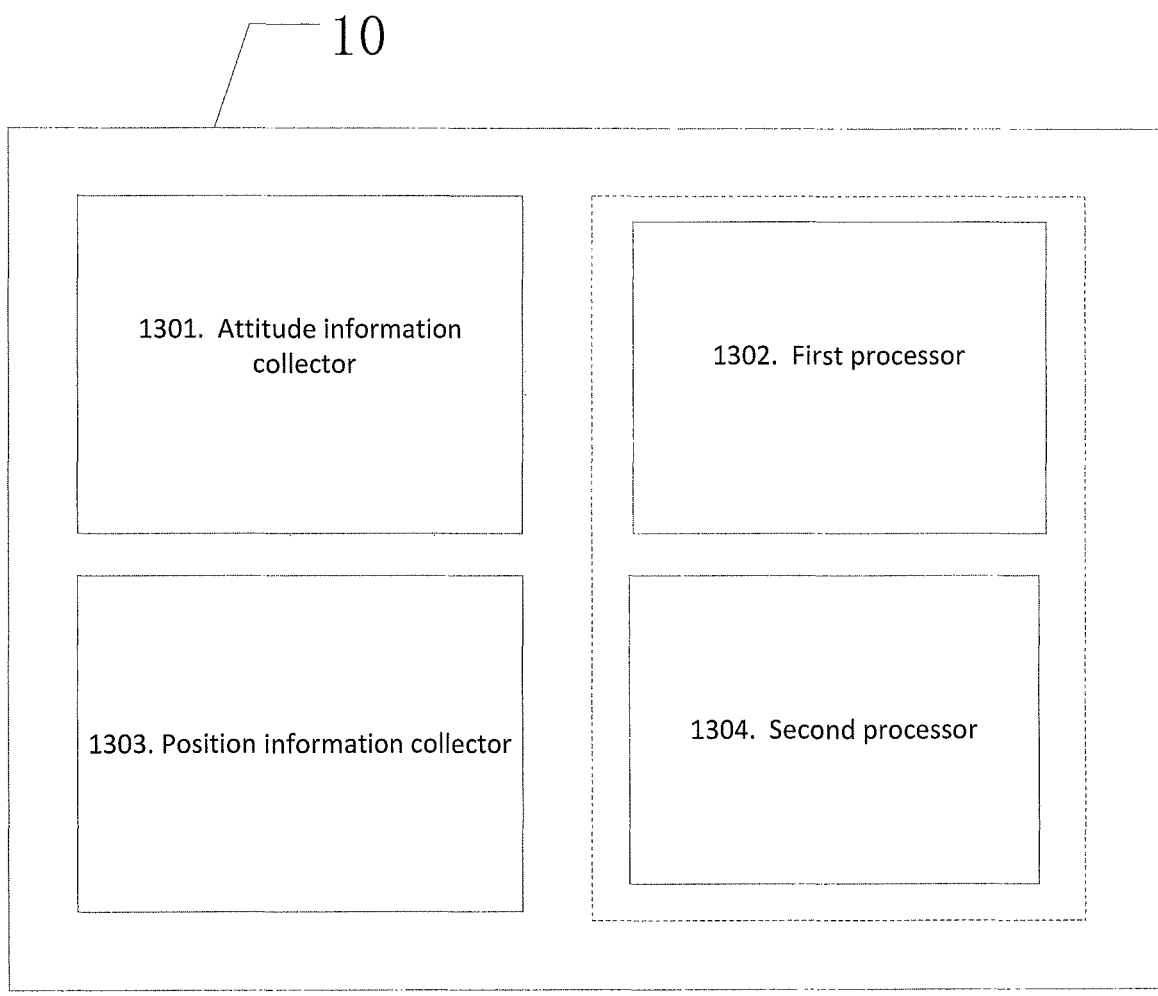
FIG. 13 is a fifth structure diagram of a robot provided by some embodiments of the disclosure.

In some embodiments of the disclosure, as shown in FIG. 13, the sub-robot further includes an attitude information collector 1301 located at the bottom of the body 10 and a first processor 1302 coupled to the attitude information collector. The attitude information collector 1301 is configured to collect information of an attitude tag, the information of the attitude tag is configured to characterize the orientation of an individual side of the sub-robot, and the first processor 1302 is configured to control the sub-robot to adjust the attitude, such that the information collected by the attitude information collector matches the predetermined information of the attitude tag.

Figures 14, 15:
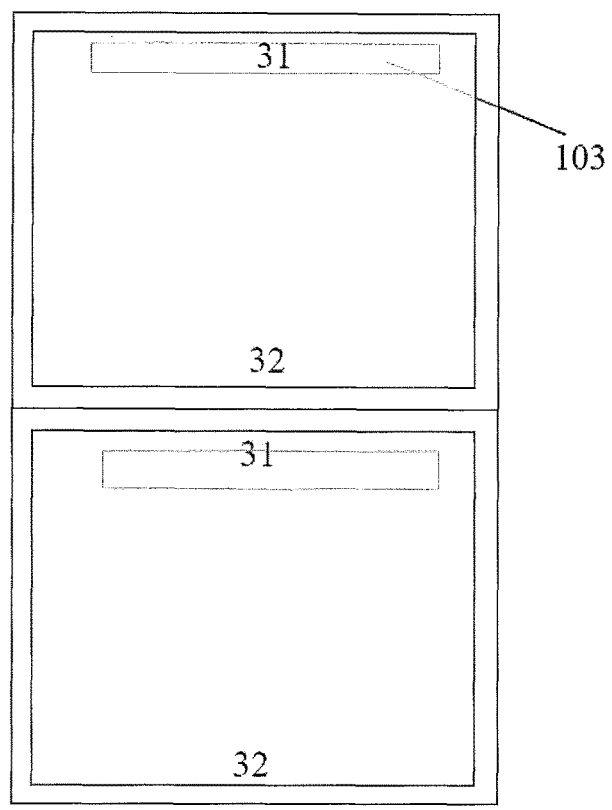
FIG. 14 is a first structure diagram of an integration region provided by some embodiments of the disclosure.
FIG. 15 is a first diagram of a corresponding situation of individual sides of a robot after splicing provided by some embodiments of the disclosure.

For example, an example is taken for illustration, in which two opposite sides of a sub-robot are arranged with the first connecting mechanism 31 and the second connecting mechanism 32. As shown in FIG. 14, when two sub-robots are spliced, the information reflected by the attitude tag 103 is configured to characterize the orientation of an individual side of a sub-robot. If the attitude tag 103 side represents the first connecting mechanism 31 side of the sub-robot, then the opposite side of the attitude tag 103 side represents the second connecting mechanism 32 side. Only when the information collected by the attitude information collectors at the bottoms of the sub-robots fully corresponds to the predetermined information of the attitude tags 103, may the two sub-robots be adjusted to preset attitudes (that is, the first connecting mechanism 31 side of one sub-robot is adjacent to the second connecting mechanism 32 side of the other sub-robot), and thereby spliced accurately by the first connecting mechanism 31 and the second connecting mechanism 32.

If the collected information of the attitude tag matches the predetermined information of the attitude tag, it means that the attitude information collector collects a complete attitude tag.

In some embodiments, the attitude information collector may for example be a camera, the receiver of a photoelectric sensor, and what the attitude tag corresponds to may be a pattern, the transmitter of the photoelectric sensor.

Exemplarily, the sub-robot further includes a position information collector 1303 located at the bottom of the body 10 and a second processor 1304 coupled to the position information collector 1303. The position information collector 1303 is configured to collect information of a position tag, the information of the position tag is configured to characterize the position where a sub-robot is located, and the second processor 1304 is configured to control the sub-robot to adjust the position, such that the information collected by the position information collector matches the predetermined information of the position tag. That is, the second processor judges whether the sub-robot has moved to a preset region by judging whether the position information collector has collected the predetermined information of the position tag.

In some embodiments, the position information collector may for example be an RF receiver, and the position tag may be an RF electronic tag.

In some embodiments, the first processor and the second processor may be integrated in a processor.

In some embodiments, the processor may be a device with the logic operation instruction execution capability such as a central processing unit (CPU) or a field programmable logic array (FPGA) or a single chip microcomputer (MCU) or a digital signal processor (DSP) or an application specific integrated circuit (ASIC), or the like.

In some embodiments, the connection may be via a wireless network, a wired network, and/or any combination thereof. The network may include a local region network, internet, telecommunications network, internet of things based on the internet and/or the telecommunications network, and/or any combination of the above networks, etc. The wired network may for example communicate by employing twisted pair, coaxial cable or fiber transmission and so on, and the wireless network may for example employ a communication mode such as 3G/4G/5G mobile communication network, Bluetooth, Zigbee or Wi-Fi, or the like. The disclosure will not restrict the type and the function of the network herein.

In some embodiments, the processor is further coupled to a memory, for example, a volatile memory and/or a non-volatile memory. The volatile memory may for example include a random access memory (RAM) and/or a cache, etc. The non-volatile memory may for example include a read-only memory (ROM), a hard disk, an erasable programmable read-only memory (EPROM), a portable compact disc read-only memory (CD-ROM), a USB memory, a flash memory, etc. In the memory may be stored one or more instruction.

By arranging a position information collector and an attitude information collector at the bottom of a sub-robot and corresponding processors, the embodiments of the disclosure may cause multiple sub-robots to implement full intelligent splicing.

Figure 16:
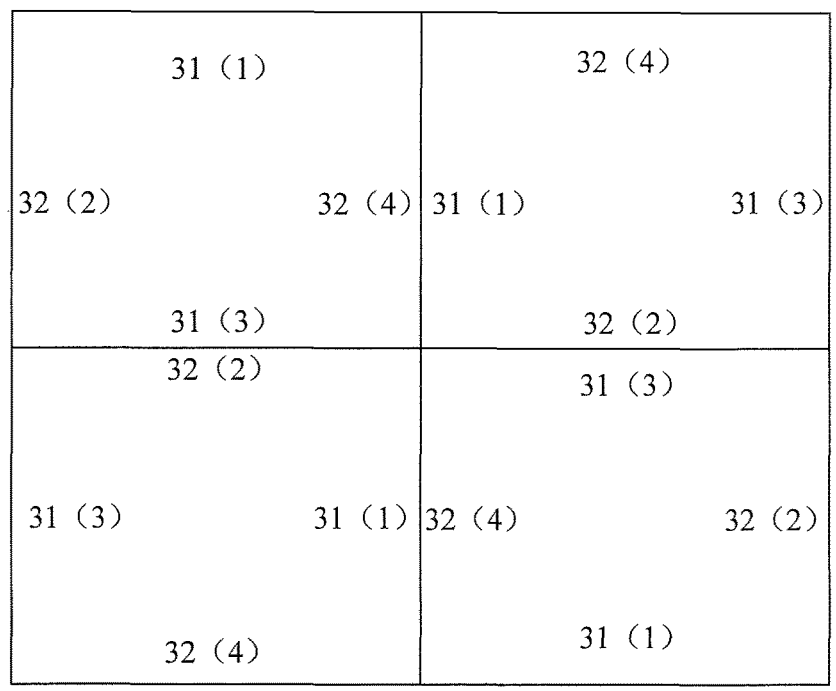
FIG. 16 is a second diagram of a corresponding situation of individual sides of a robot after splicing provided by some embodiments of the disclosure.

In some embodiments of the disclosure, as shown in FIG. 15 and FIG. 16, the body 10 is a cube, and the sub-robot includes two first connecting mechanisms 31 and two second connecting mechanisms 32 located on four sides of the body 10, respectively.

In some embodiments, the body of the sub-robot may also be a cuboid.

In some embodiments, two first connecting mechanisms 31 may be located on two opposite sides of the body 10, as shown in FIG. 14, or also may be located on two adjacent sides of the body 10, as shown in FIG. 15.

By arranging two first connecting mechanisms 31 and two second connecting mechanisms 32 on the four sides of the body of the cube, the embodiments of the disclosure may cause multiple sub-robots to be spliced to the required scale.

Figure 17:
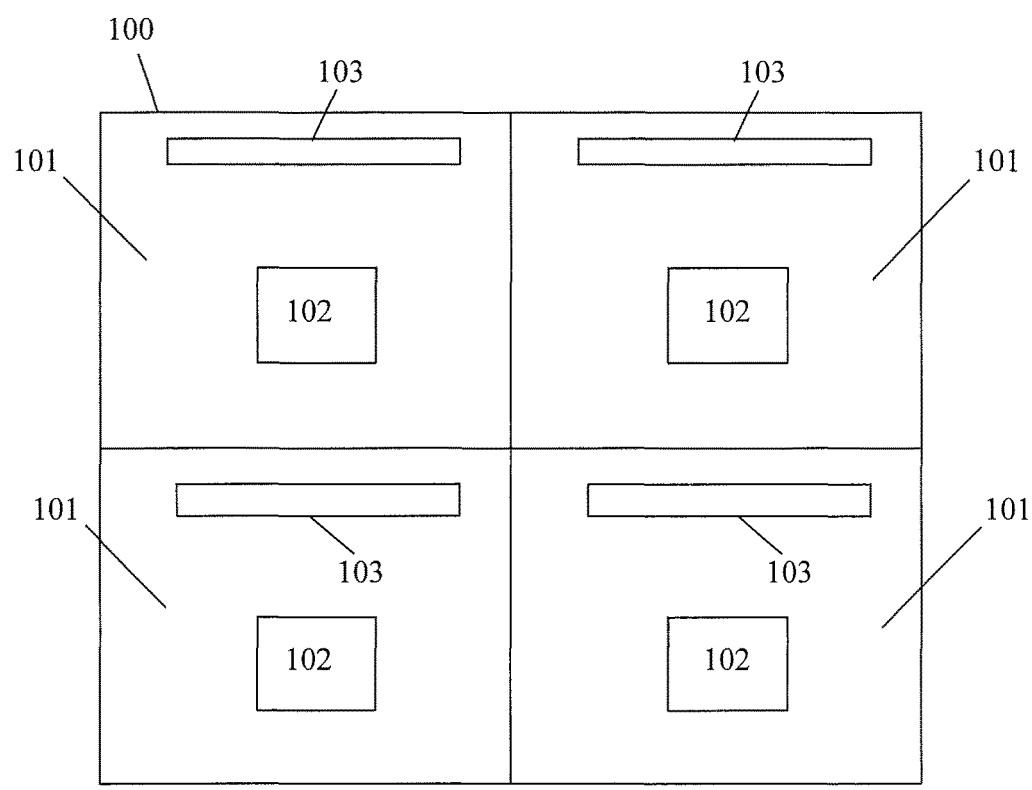
FIG. 17 is a second structure diagram of an integration region provided by some embodiments of the disclosure.

At least one embodiment of the disclosure further provides a robot splicing system including sub-robots as shown in FIG. 15 and FIG. 16 and further including position tags 102 and attitude tags 103. At least one of the position tags 102 and the attitude tags 103 corresponds to one sub-robot, forming a sub-region 101 corresponding to the one sub-robot. These sub-regions together form an integrated region 100, as shown in FIG. 17.

For example, the region 100 may be arranged on the ground.

For example, take the sub-robots shown in FIG. 15 as an example. 1, 2, 3, and 4 in FIG. 15 represent the four sides of the body 10 of a sub-robot. Each robot in FIG. 15 includes two first connecting mechanisms 31 located on adjacent sides (1, 2) and two second connecting mechanisms 32 located on adjacent sides (3, 4). When multiple sub-robots are spliced, they may be spliced into various shapes. However, the direction of each sub-robot is the same, the side 1 is coupled to the side 3, and the side 2 is coupled to the side 4. As such, in the process of splicing, the splicing of any two sub-robots is such that the first connecting mechanism 31 of one sub-robot is coupled to the second connecting mechanism 32 of the sub-robot adjacent to it.

For example, take the sub-robots shown in FIG. 16 as an example. 1, 2, 3, and 4 in FIG. 16 represent the four sides of the body 10 of a robot. Each sub-robot in FIG. 16 includes two first connecting mechanisms 31 located on opposite sides (1, 3) and two second connecting mechanisms 32 located on opposite sides (2, 4). According to the positions where the attitude tags are arranged, each sub-robot may be caused to be adjusted to a preset attitude, such that the side 1 is coupled to the side 4, and the side 2 is coupled to the side 3. As such, in the process of splicing, the splicing of any two sub-robots is such that the first connecting mechanism 31 of one sub-robot is coupled to the second connecting mechanism 32 of the sub-robot adjacent to it.

Of course, FIG. 15 and FIG. 16 are just a specific illustration, and do not make any restrictions. Other structures which may cause multiple sub-robots to be spliced by the first connecting mechanism(s) 31 and the second connecting mechanism(s) 32 will all belong to the protection scope of the disclosure.

Therein, the sub-robot accurately finds the attitude tag 103 in a sub-region 101 by the attitude information collector and the first processor, and accurately finds the position tag 102 in the sub-region 101 by the position information collector and the second processor, and when the sub-robots finish being spliced in the robot splicing system, the first connecting mechanism 31 of one sub-robot is coupled to the second connecting mechanism 32 of the sub-robot adjacent to it.

In some embodiments of the disclosure, to facilitate a sub-robot to be adjusted to a preset attitude and a preset position in a sub-region 101, the area of each sub-region 101 is greater than that of the ground occupied by the sub-robot.

At least one embodiment of the disclosure further provides a method for splicing a robot as described above, which method includes the following steps:

S10, moving at least two sub-robots to selected positions of corresponding adjacent sub-regions respectively, and adjusting each of the at least two sub-robots to a selected attitude, and S20, fixing at least one of the at least two sub-robots, moving at least one other sub-robot located in a sub-region adjacent to the sub-region where the fixed sub-robot is located in a direction toward the fixed sub-robot, and connecting the fixed sub-robot and the moved sub-robot by a first connecting mechanism 31 and a second connecting mechanism 32.

In the following, a robot splicing method provided by the disclosure will be described by a specific embodiment.

Figure 18:
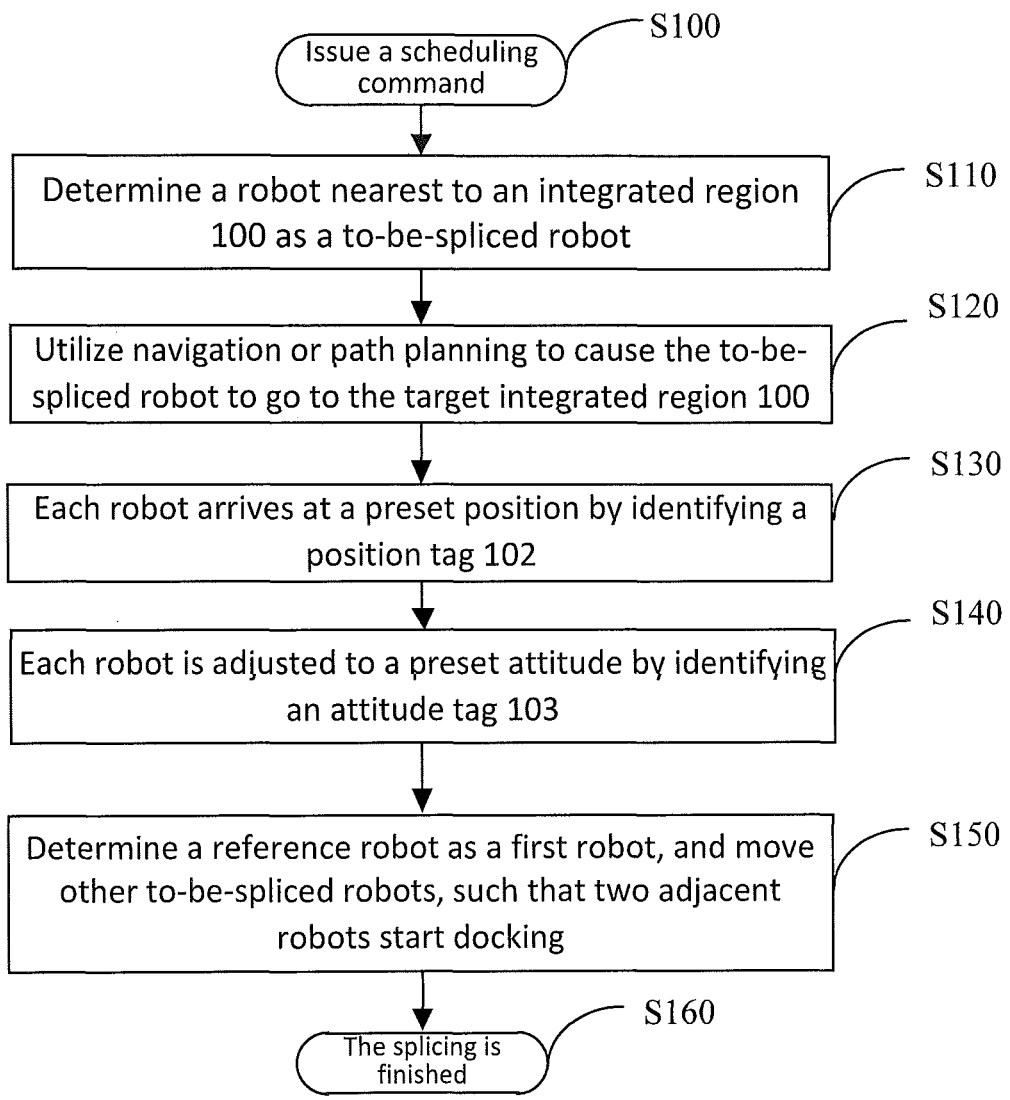
FIG. 18 is a first flow chart of a robot splicing method provided by some embodiments of the disclosure.

In some embodiments of the disclosure, there is provided a method for splicing a robot as described above. As shown in FIG. 18, the method includes the following steps.

S100, a scheduling command is issued.

S110, a sub-robot nearest to an integrated region 100 is determined as a to-be-spliced sub-robot.

For example, a to-be-spliced first sub-robot and second sub-robot are determined.

S120, navigation or path planning is utilized to cause the to-be-spliced robot sub-robot to go to the target integrated region 100.

For example, it may be possible to arrange a laser radar in the sub-robot, or edit a program command in advance, such that the sub-robot goes to the integrated region 100 according to a predetermined path.

S130, each sub-robot arrives at a preset position by identifying a position tag 102.

S140, each sub-robot is adjusted to a preset attitude by identifying an attitude tag 103.

S150, a reference robot is determined as a first sub-robot, and other to-be-spliced sub-robots are moved, such that two adjacent sub-robots start docking.

S160, the splicing is finished.

Figure 19:
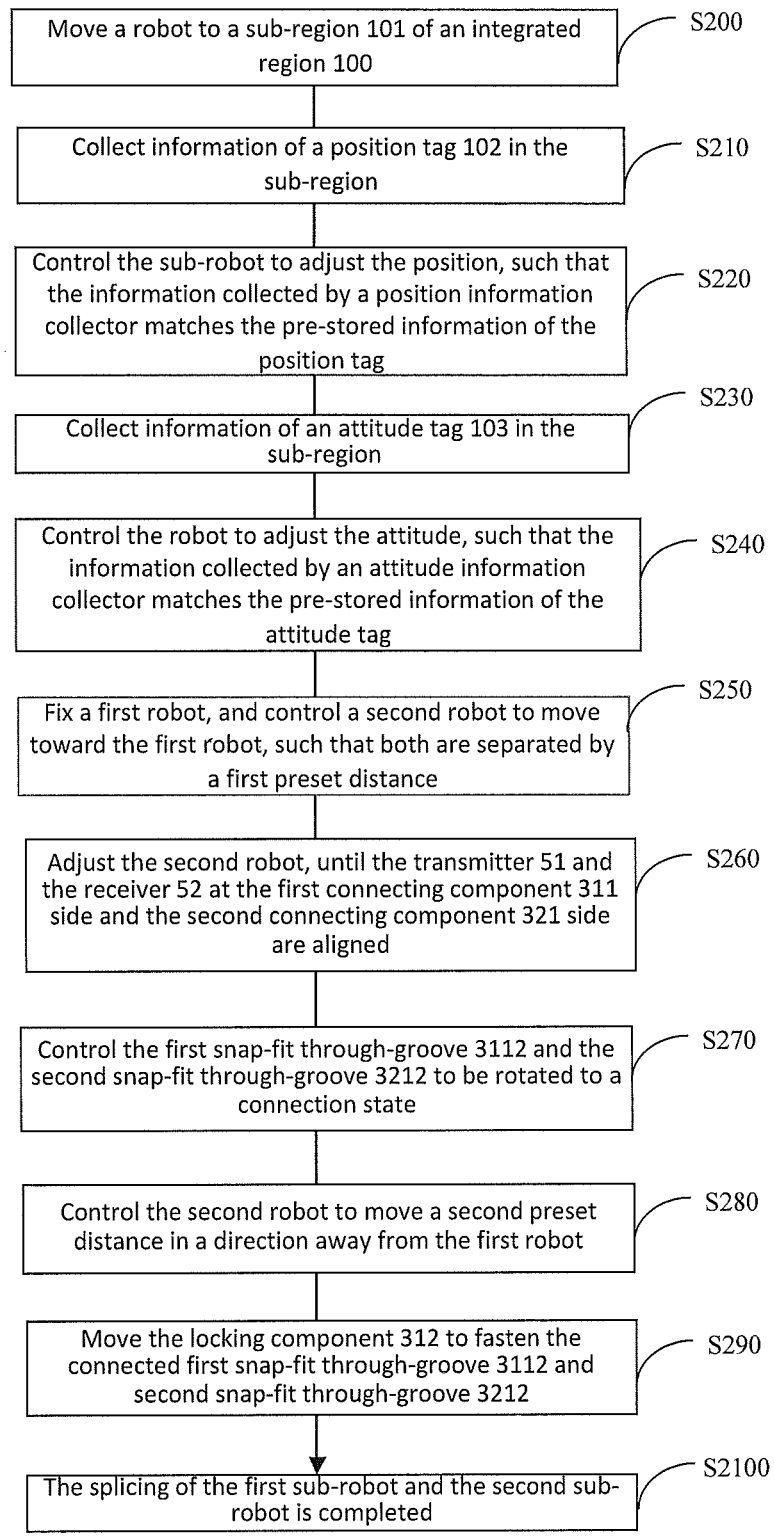
FIG. 19 is a second flow chart of a robot splicing method provided by some embodiments of the disclosure.

In some embodiments of the disclosure, there is provided a method for splicing a robot as described above. Taking that two sub-robots are spliced as an example, as shown in FIG. 19, the method includes the following steps.

S200, a sub-robot is moved to a sub-region 101 of an integrated region 100,

S210, information of a position tag 102 in the sub-region is collected,

S220, the sub-robot is controlled to adjust the position, such that the information collected by a position information collector matches the predetermined information of the position tag, S230, information of an attitude tag 103 in the sub-region is collected, and S240, the sub-robot is controlled to adjust the attitude to detect the whole attitude tag 103, such that the information collected by an attitude information collector matches the predetermined information of the attitude tag.

Here, the step of detecting the whole attitude tag 103 may be divided into two steps: the first is to preliminarily detect whether an attitude tag 103 has been detected, and if yes, the sub-robot is rotated, and it is judged whether the whole attitude tag 103 has been detected.

Figure 20:
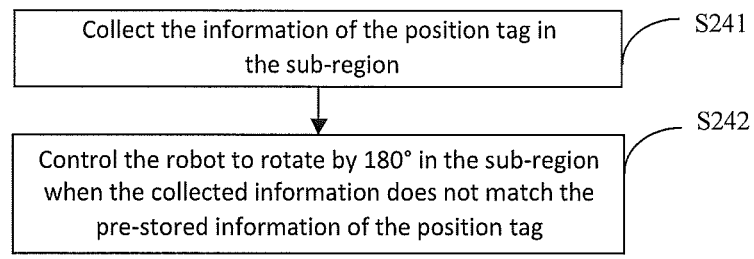
FIG. 20 is a third flow chart of a robot splicing method provided by some embodiments of the disclosure.

Therein, when the integrated region 100 includes a position tag 102 and an attitude tag 103 and the attitude tag 103 is parallel to one side of the sub-robot, as shown in FIG. 20, between the steps S240 and S250 there are further included:

S241, collecting the information of the position tag 102 in the sub-region 101, and S242, controlling the sub-robot to rotate by 180° in the sub-region 101 when the collected information does not match the predetermined information of the position tag 102.

As such, it may be avoided that the sub-robot deviates from the original position when adjusting the attitude.

S250, a first sub-robot is fixed, and a second sub-robot is controlled to move toward the first sub-robot, such that both are separated by a first preset distance. Here, suppose that the second sub-robot is adjusted to an appropriate position according to the above embodiment.

Therein, to facilitate the connection of the first snap-fit through-groove 3112 and the second snap-fit through-groove 3212, the second snap-fit through-groove 3212 may be first raised, until the opening of the second snap-fit through-groove 3212 is away from the body 10, before the step S250 is performed.

S260, the second sub-robot is adjusted, until the transmitter 51 and the receiver 52 at the first connecting component 311 side and the second connecting component 321 side corresponding to the first sub-robot and the second sub-robot are aligned.

At this point, if the first sub-robot and the second sub-robot are far apart, it may be possible to control the second sub-robot to move toward the first sub-robot, such that both are separated by a third preset distance, and then perform step S270.

S270, the first snap-fit through-groove 3112 and the second snap-fit through-groove 3212 are controlled to be rotated to a connection state.

For example, it may be possible to cause the first snap-fit through-groove 3112 and the second snap-fit through-groove 3212 to be rotated to the horizontal, and the openings of the grooves are opposite to each other.

S280, the second sub-robot is controlled to move a second preset distance in a direction away from the first sub-robot.

Therein, the second preset distance is subject to the objective restriction of the snap-fit parts of the first snap-fit through-groove 3112 and the second snap-fit through-groove 3212, and may be determined accordingly according to engineering tests.

That is, the first snap-fit through-groove 3112 and the second snap-fit through-groove 3212 are caused to be tensioned.

S290, the locking component 312 is moved to fasten the connected first snap-fit through-groove 3112 and second snap-fit through-groove 3212.

Figure 21:
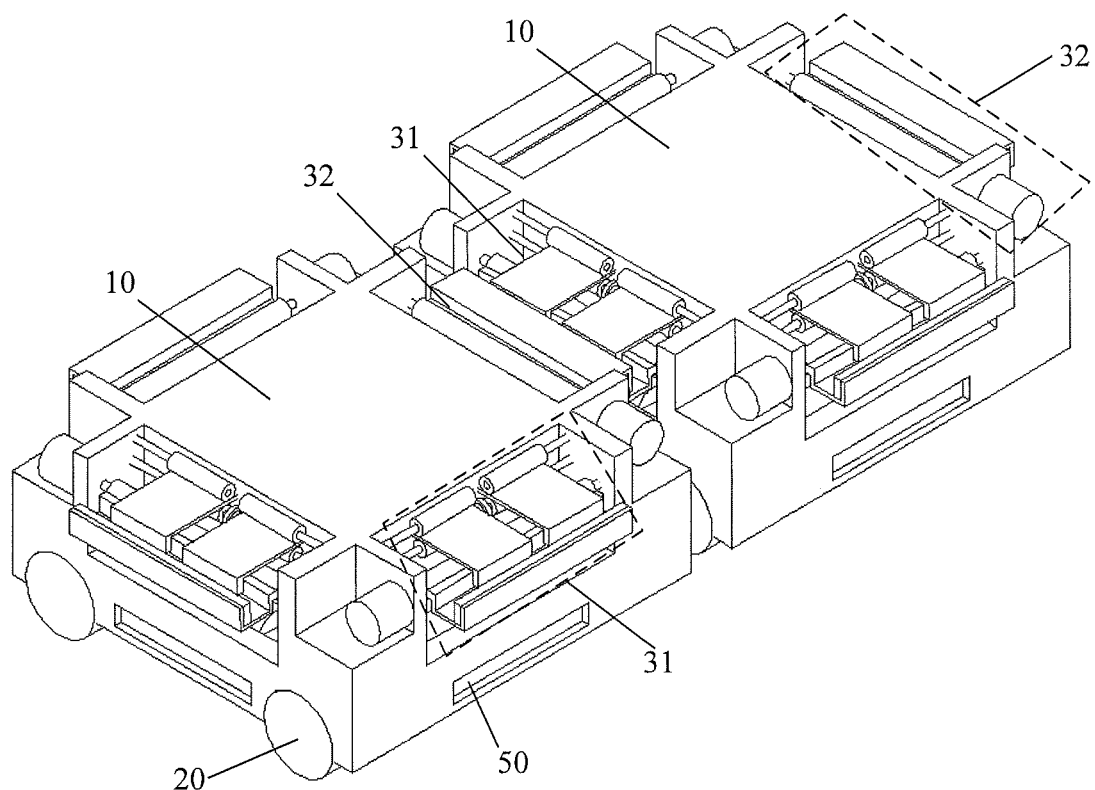
FIG. 21 is a structure diagram of two spliced robots provided by some embodiments of the disclosure.

S2100, the splicing of the first sub-robot and the second sub-robot is completed, as shown in FIG. 21.

Figure 22:
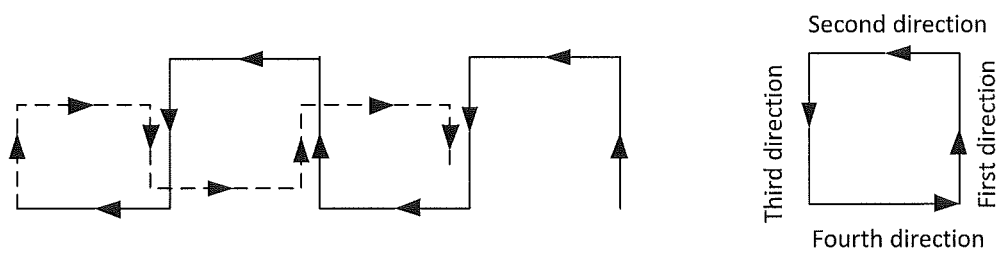
FIG. 22 is a trajectory diagram of a robot when the robot is adjusted to a preset attitude provided by some embodiments of the disclosure.

Therein, the step of adjusting the sub-robot such that the attitude tag 103 may be detected includes:

controlling the sub-robot to move a fifth preset distance in a first direction, as shown in FIG. 22, matching the collected information of the attitude tag with the predetermined information of the attitude tag, and in the case of mismatch, controlling the sub-robot to move a sixth preset distance in a second direction, matching the collected information of the attitude tag with the predetermined information of the attitude tag, and in the case of mismatch, controlling the sub-robot to move a seventh preset distance in a third direction, matching the collected information of the attitude tag with the predetermined information of the attitude tag, and in the case of mismatch, controlling the sub-robot to move an eighth preset distance in the second direction, matching the collected information of the attitude tag with the predetermined information of the attitude tag, and in the case of mismatch, repeating the above steps M times, matching the collected information of the attitude tag with the predetermined information of the attitude tag, and in the case of mismatch, controlling the sub-robot to move a ninth preset distance in a fourth direction, matching the collected information of the attitude tag with the predetermined information of the attitude tag, and in the case of mismatch, controlling the sub-robot to move a tenth preset distance in the first direction, matching the collected information of the attitude tag with the predetermined information of the attitude tag, and in the case of mismatch, controlling the sub-robot to move an eleventh preset distance in the fourth direction, matching the collected information of the attitude tag with the predetermined information of the attitude tag, and in the case of mismatch, controlling the sub-robot to move a twelfth preset distance in the third direction, and matching the collected information of the attitude tag with the predetermined information of the attitude tag, and in the case of mismatch, repeating the above steps N times, wherein the first direction and the third direction are perpendicular to the second direction and the fourth direction, the first direction is opposite to the third direction, the second direction is opposite to the fourth direction, and the first direction is parallel to one side of the sub-robot.

The above fifth preset distance to the twelfth preset distance, or even the individual preset distances at the subsequent steps repeated N times, may be selected to be set to the same, for example, a distance P. Generally, the distance is less than the side length of the sub-region 101. Exemplarily, the distance is far less than the length of side of the sub-region 101, because at this point the adjustment of position has been done, and the above steps are to find the tag in the sub-region. An extreme situation is such that the tag is arranged along the side length of one side of the sub-region, the attitude of the sub-robot differs from the intended attitude by 180 degrees, and the attitude information collector corresponds to the opposite side of the sub-region. At this point, the sub-robot needs to move about a distance of the side length toward the tag, so that the tag may be found. On one hand, when an adjacent sub-region is not occupied, the number of repetitions of the above steps may be defined based on the distance P and the side length. On the other hand, if the adjacent sub-region is occupied, moving thereto will deviate from the original sub-region, such that most parts are in the adjacent sub-region. To avoid such a situation, the position is detected at the same time when the attitude is adjusted, and if the position deviates, for example, with the method as shown in FIG. 20, the sub-robot is rotated by 180 degrees. The restriction of operations in the sub-region helps to avoid the problem that operations cannot be performed due to the existence of other sub-robot in the adjacent sub-region.

If the attitude tag is still not detected after moving one side length, one possibility is that the distance P is set relatively large and the attitude tag is missed, and the second round may be to move in the opposite direction with a reduced distance P' in a similar way, namely, right-angled S shape, as shown by the dashed line in FIG. 22. It may further be possible to move in other direction in the above way, until the attitude tag is detected. The principle is the same, and will not be repeated here any longer.

What are described above are just specific embodiments of the disclosure, however, the protection scope of the disclosure is not limited thereto, and variations or alternatives easily occurring to any artisan familiar with the technical field within the technical scope disclosed by the disclosure should be encompassed within the protection scope of the disclosure. Therefore, the protection scope of the disclosure should be subject to the protection scope of the claims.

The invention claimed is:

1. A robot, comprising:
at least two sub-robots, each of the at least two sub-robots comprising a body, a mobile member located at a bottom of the body, and at least one first connecting mechanism and at least one second connecting mechanism located on different first and second sides of the body, respectively,
wherein the at least one first connecting mechanism of at least one sub-robot of the at least two sub-robots is configured to be in a fit connection with the at least one second connecting mechanism of at least one other sub-robot of the at least two sub-robots,
wherein the at least one second connecting mechanism of the at least one sub-robot is configured to be in a fit connection with the at least one first connecting mechanism of at least one other sub-robot of the at least two sub-robots,
wherein the at least one first connecting mechanism comprises a first connecting component, and the at least one second connecting mechanism comprises a second connecting component, and the first connecting component is configured to be in a snap-fit connection with the second connecting component of at least one other sub-robot of the at least two sub-robots, and the second connecting component is configured to be in a snap-fit connection with the first connecting component of at least one other sub-robot of the at least two sub-robots,
wherein the first connecting component comprises a first rotating shaft and a first snap-fit through-groove fixedly coupled to the first rotating shaft, and the second connecting component comprises a second rotating shaft and a second snap-fit through-groove fixedly coupled to the second rotating shaft, and
wherein, in coupling the at least one sub-robot to a second sub-robot of the at least two sub-robots, the first snap-fit through-groove of the at least one sub-robot and the second snap-fit through-groove of the second sub-robot are configured to be rotated to a respective connection state, wherein the respective connection state is such that a first front side wall of the first snap-fit through-groove fits in the second snap-fit through-groove and a second front side wall of the second snap-fit through-groove fits in the first snap-fit through-groove, such that the first snap-fit through-groove of the at least one sub-robot is in a pull connection with the second snap-fit through-groove of the second sub-robot.

2. The robot as claimed in claim 1, wherein the first snap-fit through-groove and the second snap-fit through-groove are configured to be rotated to a retracted state, wherein the retracted state is such that a first opening of the first snap-fit through-groove faces away from the body, and a second opening of the second snap-fit through-groove faces the body.

3. The robot as claimed in claim 1, wherein an inside of the first front side wall of the first snap-fit through-groove comprises a first elastic member, and/or an inside of the second front side wall of the second snap-fit through-groove comprises a second elastic member.

4. The robot as claimed in claim 1, wherein the at least one first connecting mechanism further comprises a locking component, and
the locking component is configured to lock the first snap-fit through-groove of the at least one sub-robot and the second snap-fit through-groove of the second sub-robot in the connection state.

5. The robot as claimed in claim 4, wherein the locking component comprises a first driving member with a third rotating shaft, a first gear, a fourth rotating shaft which is arranged along a center axis of the first gear and is configured to drive the first gear to rotate, a synchronous belt of which first and second ends are set around the third rotating shaft and the fourth rotating shaft, respectively, and a rack that engages with the first gear, and
wherein a front end of the rack is configured to abut the second front side wall of the second snap-fit through-groove coupled to the first snap-fit through-groove in the connection state.

6. The robot as claimed in claim 5, wherein the front end of the rack comprises a blocking member, and a front end of the blocking member comprises a third elastic member.

7. The robot as claimed in claim 5, wherein the rack is a double-sided rack, and two surfaces of the rack which face away from each other are arranged with teeth, and
the locking component further comprises a second gear, and the second gear and the first gear engage with the teeth on the two surfaces of the rack, respectively.

8. The robot as claimed in claim 1, wherein the first connecting component further comprises a second driving member configured to drive the first rotating shaft to rotate, and the second connecting component further comprises a third driving member configured to drive the second rotating shaft to rotate.

9. The robot as claimed in claim 1, wherein the robot further comprises a distance sensor, and
the distance sensor is located at the first side of the body and/or the distance sensor is located at the second side of the body.

10. A robot, comprising:
at least two sub-robots, each of the at least two sub-robots comprising a body, a mobile member located at a bottom of the body, and at least one first connecting mechanism and at least one second connecting mechanism located on different first and second sides of the body, respectively,
wherein the at least one first connecting mechanism of at least one sub-robot of the at least two sub-robots is configured to be in a fit connection with the at least one second connecting mechanism of at least one other sub-robot of the at least two sub-robots,
wherein the at least one second connecting mechanism of the at least one sub-robot is configured to be in a fit connection with the at least one first connecting mechanism of at least one other sub-robot of the at least two sub-robots, and wherein:
the robot further comprises a photoelectric sensor, which comprises a transmitter and a receiver,
the first side and the second side comprise the transmitter and the receiver, respectively, and in a process of the at least one sub-robot being coupled to a second sub-robot of the at least two sub-robots, the transmitter and the receiver of the first side and the second are aligned, or both the first side and the second side comprise a respective transmitter and receiver, and in the process of the at least one sub-robot being coupled to the second sub-robot, the respective transmitter of the first side is aligned with the respective receiver of the second side, and vice versa.

11. The robot as claimed in claim 10, wherein the robot further comprises an attitude information collector located at the bottom of the body and a first processor coupled to the attitude information collector, the attitude information collector is configured to collect information of an attitude tag, and the information of the attitude tag is configured to characterize an orientation of an individual side of the robot, and the first processor is configured to control the at least two sub-robots to adjust respective attitudes, such that attitude information collected by the attitude information collector matches the information of the attitude tag.

12. The robot as claimed in claim 11, wherein the robot further comprises a position information collector located at the bottom of the body and a second processor coupled to the position information collector, the position information collector is configured to collect information of a position tag, and the information of the position tag is configured to characterize respective positions where the at least two sub-robots are located, and the second processor is configured to control the at least two sub-robots to adjust the respective positions, such that position information collected by the position information collector matches the information of the position tag.

13. A robot splicing system, comprising:

position tags and attitude tags, at least one of the position tags and the attitude tags corresponding to one sub-robot of the at least two sub-robots of claim 1, forming a respective sub-region corresponding to the one sub-robot, in the respective sub-region, the position tag being configured to characterize a position of the one sub-robot, and the attitude tag being configured to characterize an orientation of an individual side of the one sub-robot.

14. A robot splicing method for a robot splicing system, wherein the robot splicing system comprises:

position tags and attitude tags, at least one of the position tags and the attitude tags corresponding to one sub-robot of at least two sub-robots, forming a respective sub-region corresponding to the one sub-robot, wherein in the respective sub-region, the position tag is configured to characterize a position of the one sub-robot, and the attitude tag is configured to characterize an orientation of an individual side of the one sub-robot, wherein each of the at least two sub-robots comprises a body, a mobile member located at a bottom of the body, and at least one first connecting mechanism and at least one second connecting mechanism located on different first and second sides of the body, respectively, wherein the at least one first connecting mechanism of at least one sub-robot of the at least two sub-robots is configured to be in a fit connection with the at least one second connecting mechanism of at least one other sub-robot of the at least two sub-robots, and wherein the at least one second connecting mechanism of the at least one sub-robot is configured to be in a fit connection with the at least one first connecting mechanism of at least one other sub-robot of the at least two sub-robots, and wherein the method comprises:

moving the at least two sub-robots to selected positions of corresponding adjacent sub-regions, respectively;

adjusting each of the at least two sub-robots to a selected attitude;

fixing a position of the at least one sub-robot of the at least two sub-robots to define a fixed sub-robot;

moving at least one other sub-robot of the at least two sub-robots to define a moved sub-robot located in a sub-region adjacent to a sub-region where the fixed sub-robot is located in a direction toward the fixed sub-robot; and connecting the fixed sub-robot and the moved sub-robot by the at least one first connecting mechanism and the at least one second connecting mechanism.

15. The method as claimed in claim 14, wherein moving the at least two sub-robots to selected positions of corresponding adjacent sub-regions respectively comprises:

moving a sub-robot of the at least two sub-robots to a corresponding sub-region, collecting information of a position tag in the corresponding sub-region, and controlling the sub-robot to adjust a position, such that information collected by a position information collector matches the information of the position tag.

16. The method as claimed in claim 14, wherein adjusting each of the at least two sub-robots to a selected attitude comprises:

collecting information of an attitude tag in a sub-region, and controlling a sub-robot of the at least two sub-robots to adjust the selected attitude, such that information collected by an attitude information collector matches the information of the attitude tag.

17. The method as claimed in claim 16, wherein the attitude tag is parallel to one side of the robot, and adjusting each of the at least two sub-robots to a selected attitude further comprises:

collecting information of a position tag in the sub-region, and controlling the sub-robot to rotate by 180° in the sub-region in a state in which collected information does not match the information of the position tag.

18. The method as claimed in claim 14, wherein connecting the fixed sub-robot and the moved sub-robot by the at least one first connecting mechanism and the at least one second connecting mechanism comprises:

fixing the position of the at least one sub-robot of the at least two sub-robots to define the fixed sub-robot, and moving the at least one other sub-robot of the at least two sub-robots to define the moved sub-robot located in the sub-region adjacent to the sub-region where the fixed sub-robot is located in the direction toward the fixed sub-robot, such that the fixed sub-robot and the moved sub-robot are separated by a first selected distance, adjusting the moved sub-robot, to align a first connecting component of the at least one first connecting mechanism with a second connecting component of the at least one second connecting mechanism, controlling a first snap-fit through-groove of the first connecting component and a second snap-fit through-groove of the second connecting component to be rotated to a respective connection state, controlling the moved sub-robot to move a second selected distance in a direction away from the fixed sub-robot, and moving a locking component, to fix the first snap-fit through-groove and second snap-fit through-groove.

* * * * *